(12) United States Patent
Hou

(10) Patent No.: US 7,695,155 B1
(45) Date of Patent: Apr. 13, 2010

(54) ILLUMINATING DEVICE FOR GLASSES

(76) Inventor: Chu Shyuan Hou, No.152, Sec. 2, Zhonghua N. Rd., North District, Tainan City 704 (TW)

(*) Notice: Subject to any disclaimer, the term of this patent is extended or adjusted under 35 U.S.C. 154(b) by 0 days.

(21) Appl. No.: 12/351,850

(22) Filed: Jan. 11, 2009

(51) Int. Cl.
*F21V 21/084* (2006.01)
(52) U.S. Cl. ............... 362/105; 362/191; 362/234; 362/253; 362/426; 362/427; 351/158
(58) Field of Classification Search .......... 362/103, 362/105, 190, 191, 234, 253, 426, 427; D16/309; 351/158; 600/249
See application file for complete search history.

(56) References Cited

U.S. PATENT DOCUMENTS

| | | | | |
|---|---|---|---|---|
| 1,741,264 A | * | 12/1929 | Wappler | .......... 362/105 |
| 3,592,525 A | * | 7/1971 | Schultz | .......... 359/481 |
| 5,676,449 A | * | 10/1997 | Newsome | .......... 362/106 |
| 6,764,194 B1 | * | 7/2004 | Cooper | .......... 362/105 |
| 7,611,241 B2 | * | 11/2009 | Chen et al. | .......... 351/158 |

* cited by examiner

*Primary Examiner*—Stephen F Husar
(74) *Attorney, Agent, or Firm*—Banger Shia

(57) ABSTRACT

An illuminating device for a pair of glasses includes an illumination control device, a housing, a coupling seat, and a positioning mechanism. The illumination control device is received in the housing and includes a lamp emitting light beams out of the housing. The coupling seat includes first and second pivotal portions. The housing is pivotably coupled with the first and second pivotal portions, so that the housing is pivotable relative to the coupling seat. The coupling seat further includes a coupling section coupled to a middle of the pair of glasses. The positioning mechanism retains the housing in a desired angular position relative to the coupling seat, adjusting an illuminating angle of the lamp.

3 Claims, 13 Drawing Sheets

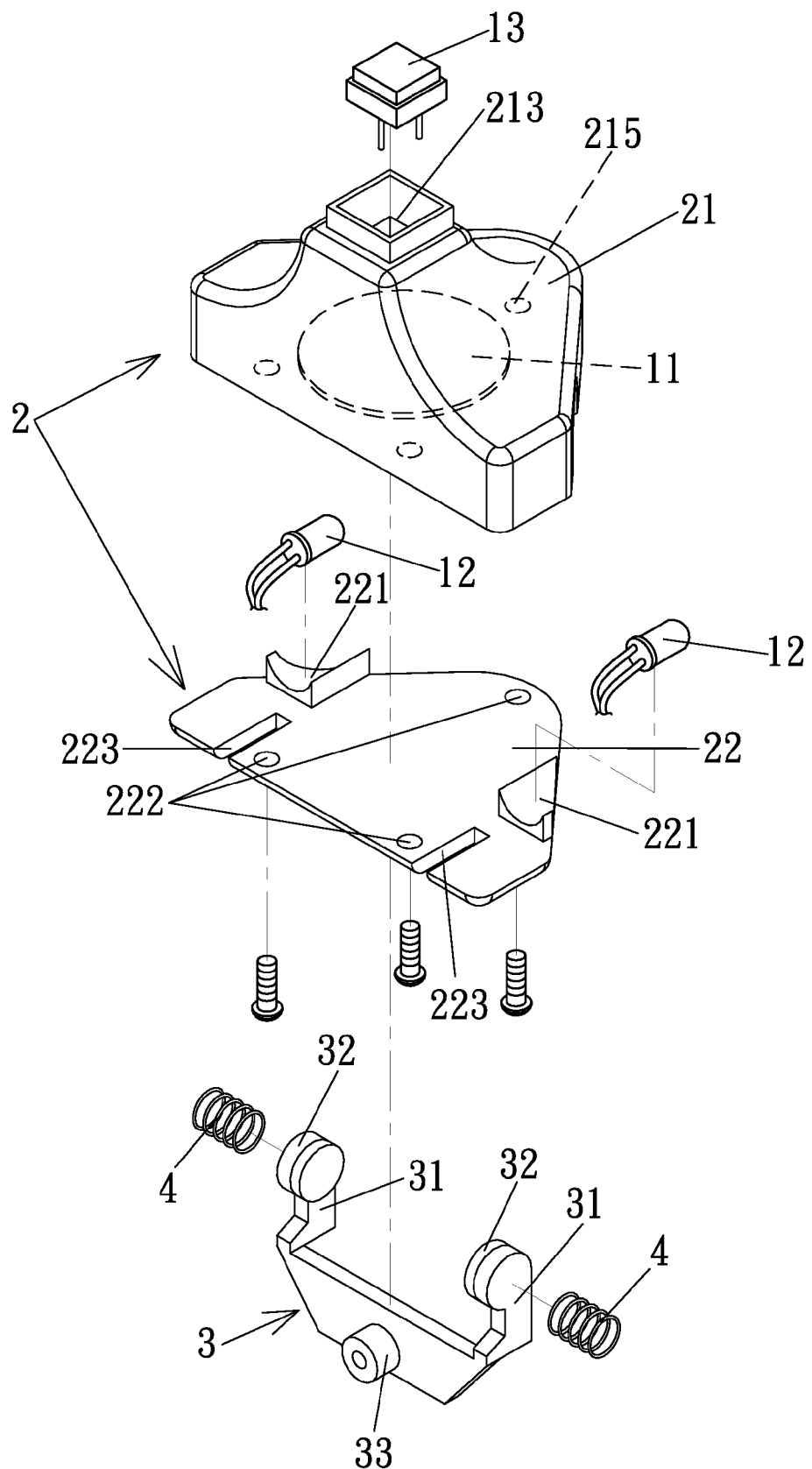
F I G . 1

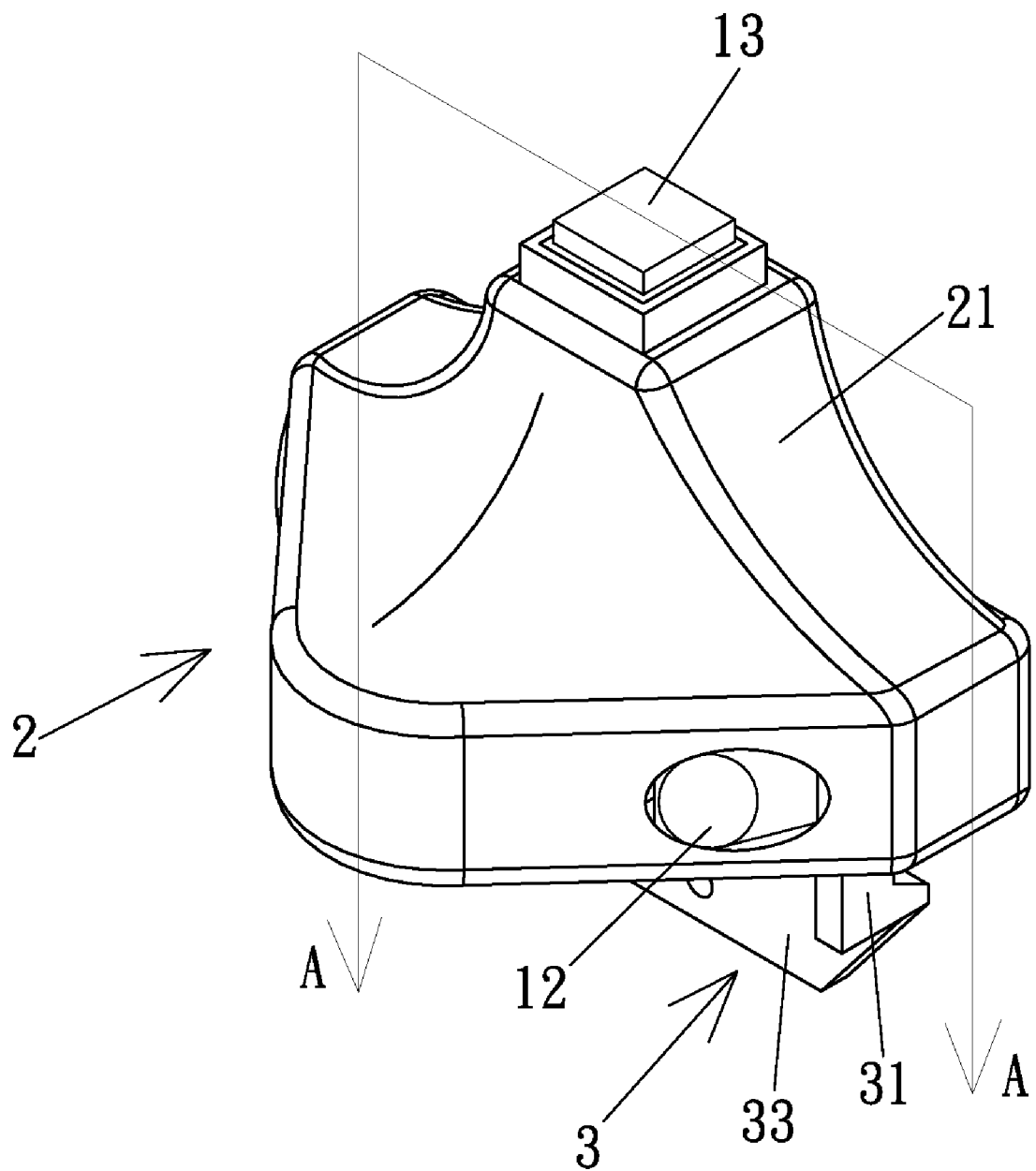
F I G . 3

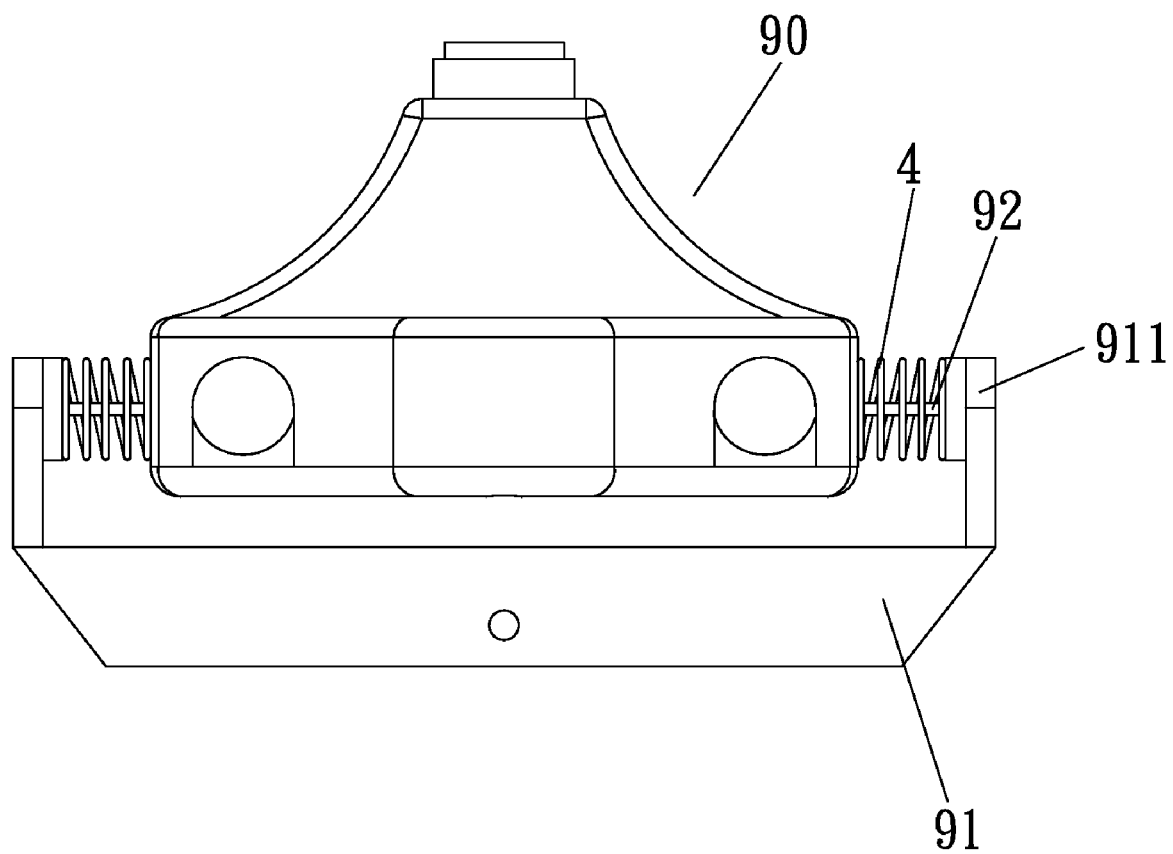
F I G . 10

ILLUMINATING DEVICE FOR GLASSES

BACKGROUND OF THE INVENTION

1. Field of the Invention

The present invention relates to an illuminating device for a pair of glasses and, more particularly, to an illuminating device mounted to a middle of a pair of glasses and adjustable in illuminating angle.

2. Description of the Related Art

It is known to install an illuminating device on a pair of glasses to provide the wearer with a bright environment for reading, working, etc. FIG. 11 shows a pair of glasses 1' including a frame and two lamps 2' and 3' mounted to two sides of the frame. However, it is difficult to adjust the crosslight of the lamps 2' and 3'.

FIGS. 12 and 13 shows a pair of glasses 4' including a frame and lamp 5' mounted to a middle of the frame to provide illumination in a central area in front of the pair of glasses 4'. However, it is difficult to adjust the position and the illuminating angle of the lamp 5'.

BRIEF SUMMARY OF THE INVENTION

An objective of the present invention is to provide an illuminating device mounted to a middle of a pair of glasses and adjustable in illuminating angle.

An illuminating device for a pair of glasses includes an illumination control device, a housing, a coupling seat, and a positioning mechanism. The illumination control device is received in the housing and includes a lamp emitting light beams out of the housing. The coupling seat includes first and second pivotal portions. The housing is pivotably coupled with the first and second pivotal portions, so that the housing is pivotable relative to the coupling seat. The coupling seat further includes a coupling section adapted to be coupled to a middle of the pair of glasses. The positioning mechanism retains the housing in a desired angular position relative to the coupling seat, adjusting an illuminating angle of the lamp.

The present invention will become clearer in light of the following detailed description of an illustrative embodiment of this invention described in connection with the drawings.

DESCRIPTION OF THE DRAWINGS

FIG. 1 shows an exploded, perspective view of an illuminating device of a first embodiment according to the preferred teachings of the present invention.

FIG. 3 shows a perspective view of the illuminating device of FIG. 1.

FIG. 10 shows a top view of an illuminating device of a fourth embodiment according to the preferred teachings of the present invention.

DETAILED DESCRIPTION OF THE INVENTION

Figure 2:
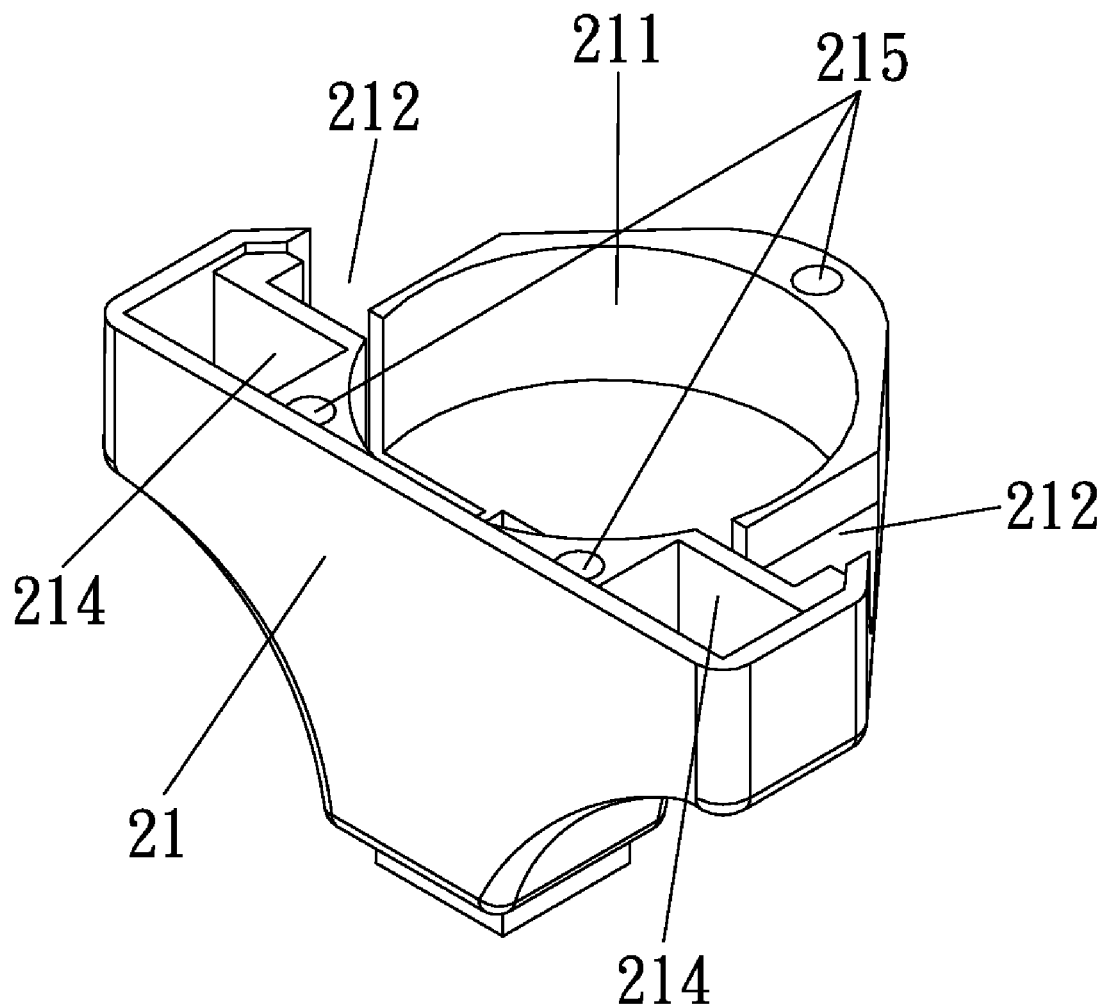
FIG. 2 shows a bottom, perspective view of a housing of the illuminating device of FIG. 1.
Figure 4:
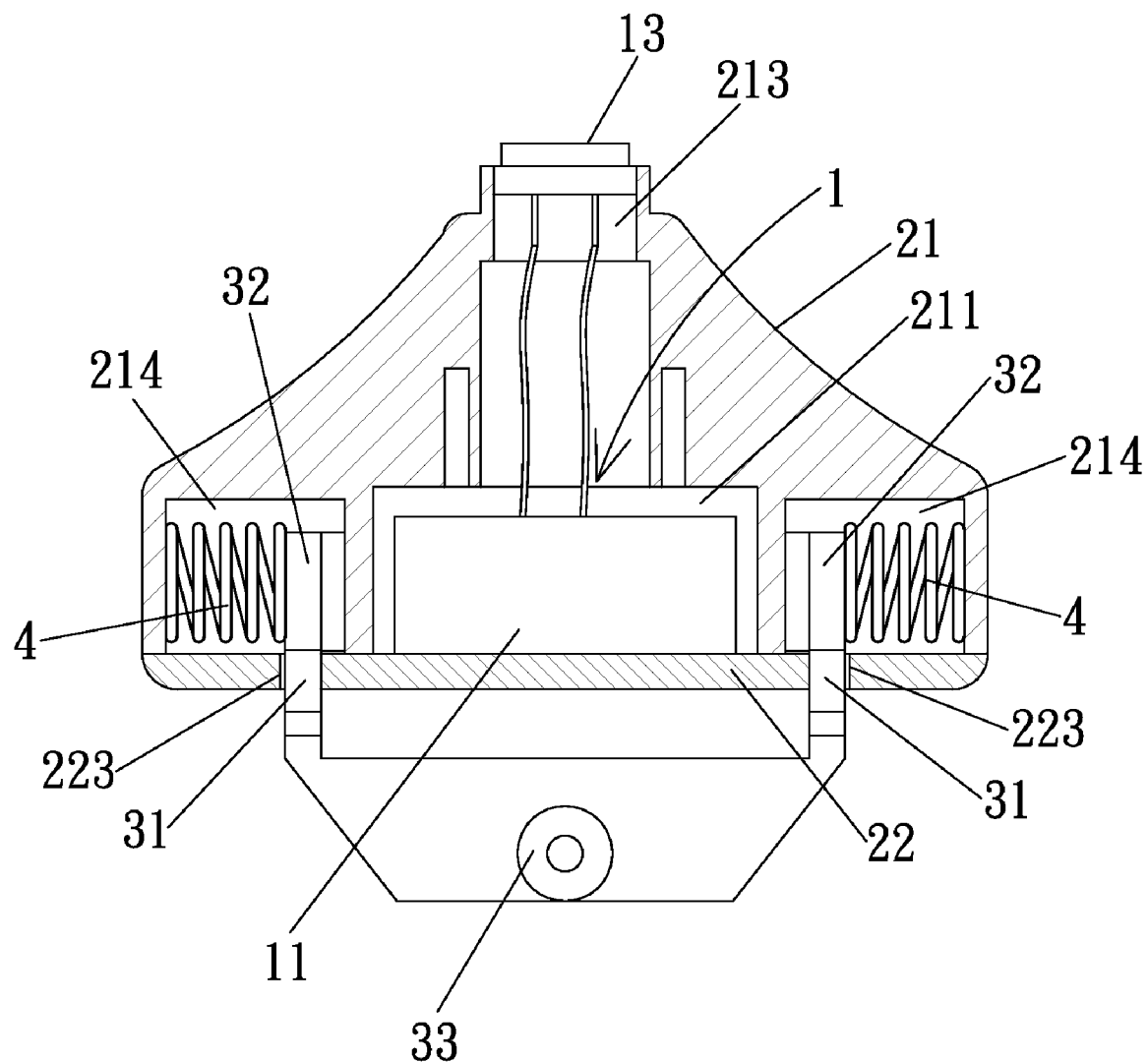
FIG. 4 shows a cross sectional view of the illuminating device of FIG. 1.
Figure 5:
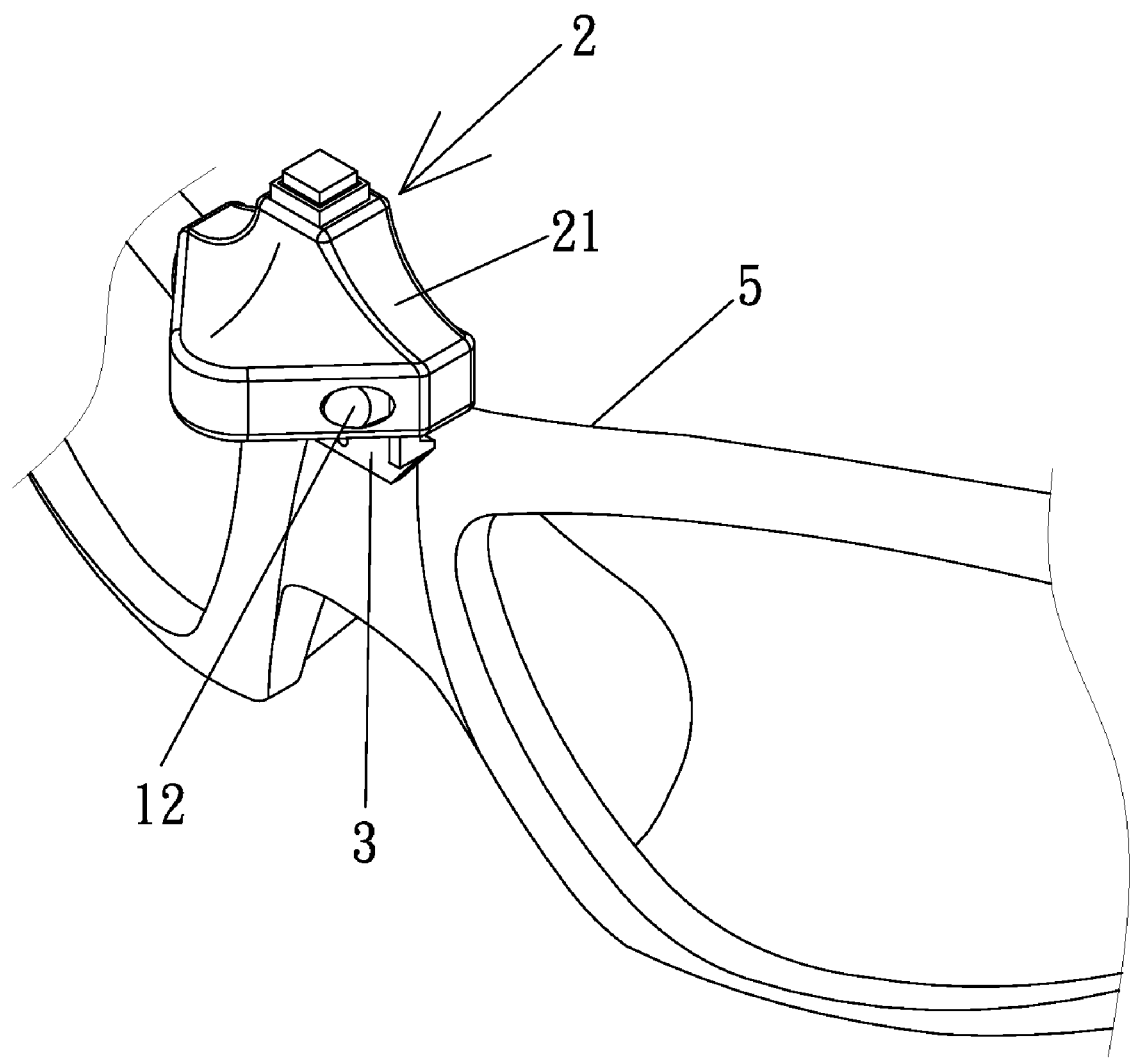
FIG. 5 shows a partial, perspective view of a pair of glasses with the illuminating device of FIG. 1 mounted on a middle of a frame of the pair of glasses.
Figure 6:
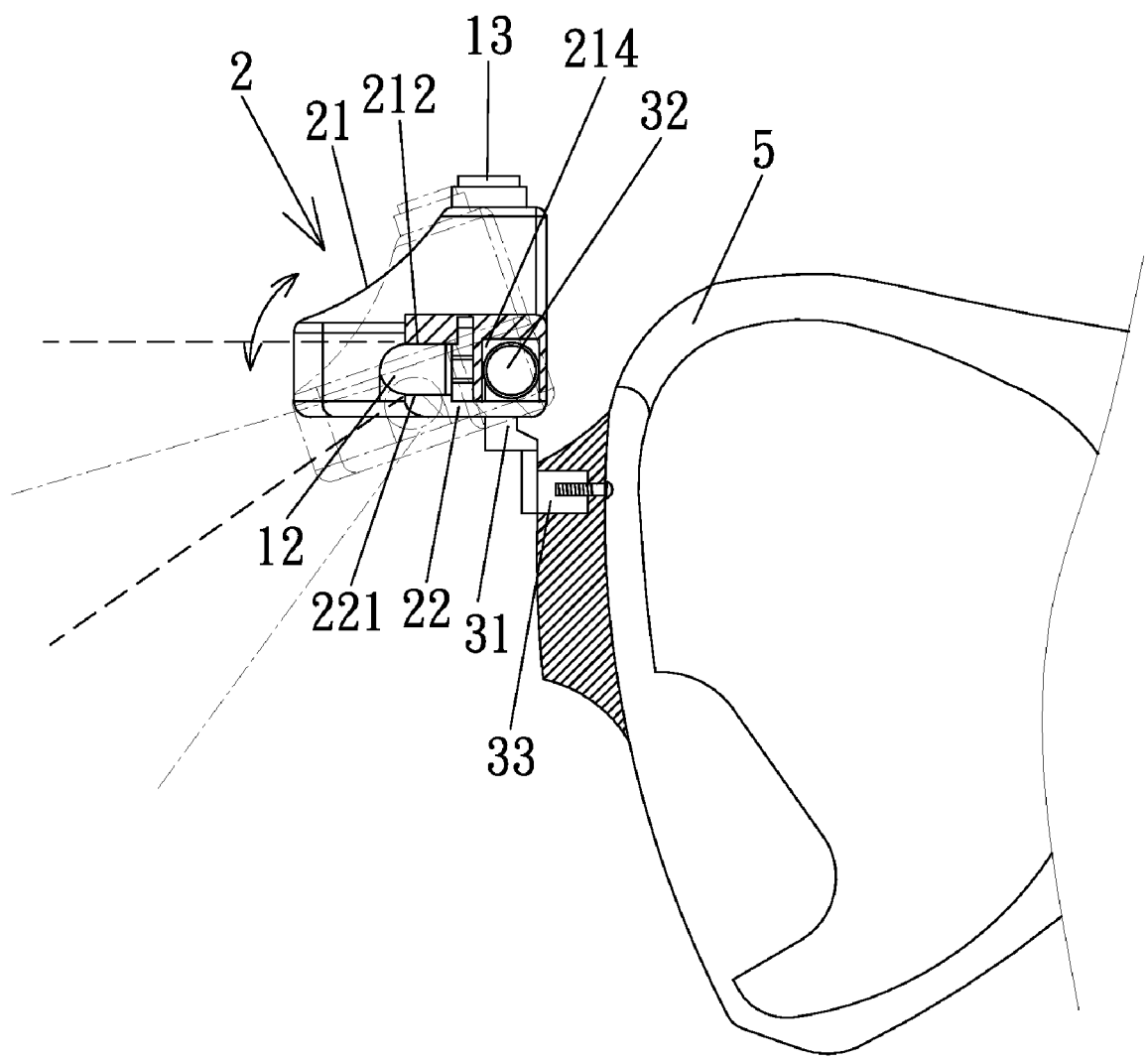
FIG. 6 shows a partial, cross sectional view of the pair of glasses of FIG. 5.

An illuminating device of a first embodiment according to the preferred teachings of the present invention is shown in FIGS. 1-6 of the drawings and mounted to a middle of a pair of glasses 5. In the most preferred form shown, the illuminating device is mounted to the middle of a frame of the pair of glasses 5. The illuminating device includes an illumination control device 1, a housing 2, a coupling seat 3, and a positioning mechanism. The illumination control device 1 includes a circuit board 11, two lamps 12 such as light-emitting diodes, and a switch 13. A battery unit and control components are mounted on the circuit board 11 and electrically connected to the lights 12. The switch 13 controls on/off of the lights 12 that emit light beams out of the housing 2.

The housing 2 includes a cover 21 and a bottom board 22 mounted to a bottom of the cover 21. The cover 21 includes a compartment 211 receiving the circuit board 11. The cover 21 further includes two grooves 212 for receiving the lamps 12. Furthermore, the cover 21 includes an opening 213 in a top side thereof for receiving the switch 13. Further, the cover 21 includes a chamber 214 in each of two sides thereof. Further, the cover 21 includes a plurality of fixing holes 215. The bottom board 22 includes two grooves 221. One of the grooves 211 of the cover 21 and one of the grooves 221 of the bottom board 22 together define a groove securely holding the lamps 12. The bottom board 22 further includes a plurality of fixing holes 222. Fasteners are extended through the fixing holes 215 and 222 to fix the cover 21 and the bottom board 22 together. The bottom board 22 further includes two slots 223 extending inward from an end edge thereof and aligned with the chambers 214 of the cover 21.

The coupling seat 3 includes two protrusions 31 on two sides thereof. Each protrusion 31 is extended through an open end of one of the slots 223 into one of the chambers 214. Each protrusion 31 includes a pivotal portion 32 having a width larger than a width of the protrusion 31 and than a width of the slots 223. Each pivotal portion 32 includes circular cross sections and received in one of the chambers 214 of the cover 21, so that the coupling seat 3 will not disengage from the housing 2. Furthermore, the housing 2 is pivotable relative to the coupling seat 3 due to provision of the pivotal portions 32. The coupling seat 3 further includes a coupling section 33 having a coupling hole for coupling with the middle of the frame of the pair of glasses 5 by a fastener.

The positioning mechanism in the first embodiment includes two elastic elements 4 respectively received in the chambers 214 of the cover 21. Each elastic element 4 includes a first end pressing against a wall of one of the chambers 214 and a second end pressing against one of the pivotal portions 32. Thus, a suitable coupling tightness is provided between the coupling seat 3 and the cover 21 by the elastic elements 4.

Since the illuminating device is mounted to the middle of the frame of the pair of glasses 5, the lamps 12 illuminate a central area in front of the pair of glasses 5. The elastic elements 4 and the pivotal portions 32 are hidden in the housing 2, providing an aesthetically pleasing effect. The housing 2 can be manually pivoted relative to the coupling seat 3 to a desired angular position (FIG. 6) to provide desired illuminating effect. After adjustment, each elastic element 4 presses against the wall of one of the chambers 214 and one of the pivotal portions 32 to retain the housing 2 in the desired angular position. Thus, the lamps 2 can provide concentrated crosslight to a precise location in front of the pair of glasses 5, and the illuminating angles of the lamps 2 can be adjusted.

Figure 7:
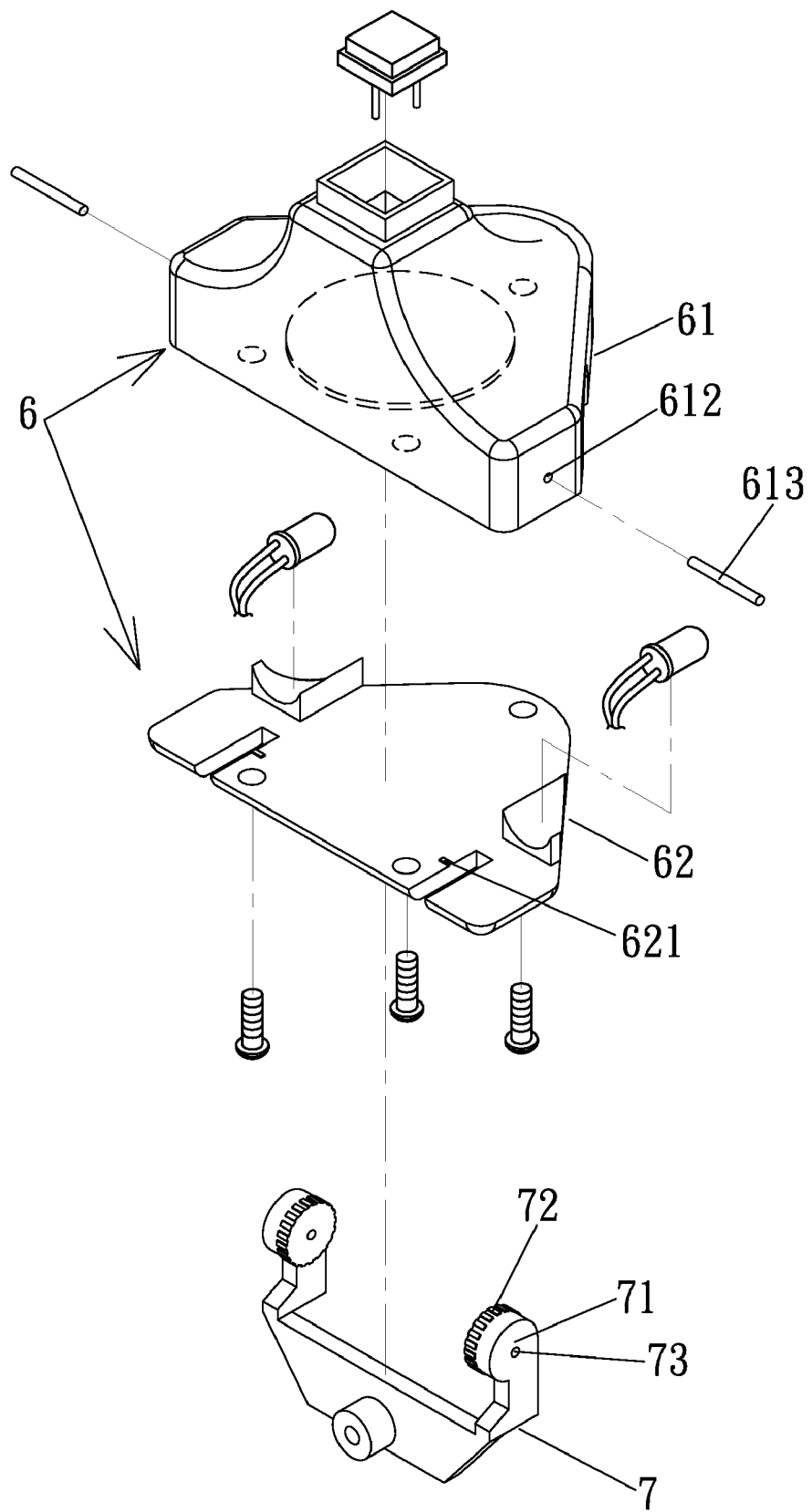
FIG. 7 shows an exploded, perspective view of an illuminating device of a second embodiment according to the preferred teachings of the present invention.
Figure 8:
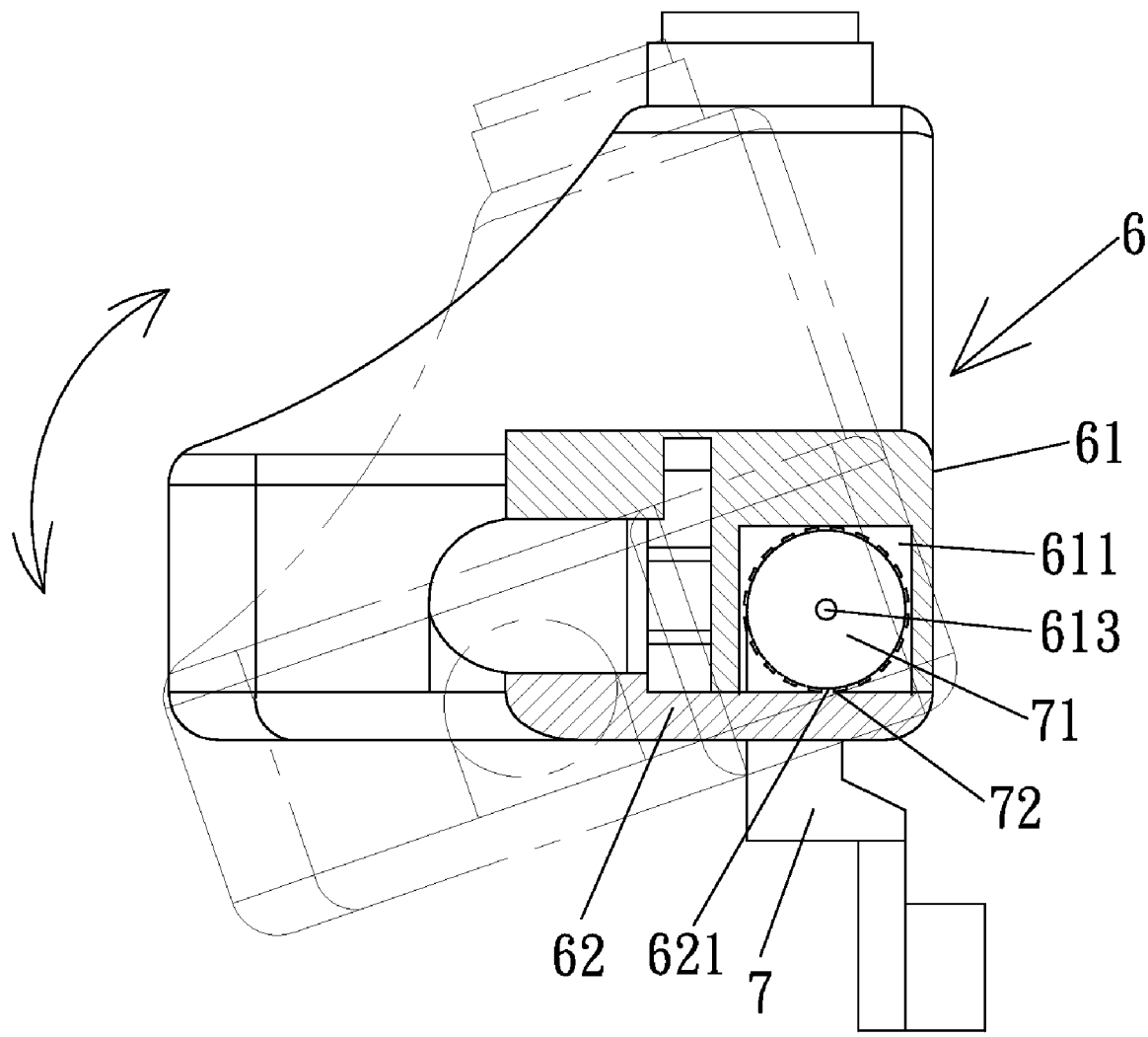
FIG. 8 shows a cross sectional view of the illuminating device of FIG. 7.

FIGS. 7 and 8 illustrate a second embodiment of the present invention, wherein the cover (now designated 61) of the housing (now designated 6) includes a pin hole 612 in each of two sides thereof and in communication with one of the chambers 214. Furthermore, the bottom board (now designated 62) includes two teeth 621. Furthermore, each pivotal portion (now designated 71) of the coupling seat (now designated 7) includes a plurality of annularly spaced teeth 72 on an inner face thereof and selectively engaged with one of the teeth 621 to position the housing 6. Each pivotal portion 71 further includes a pivot hole 73 extending from the inner face through an outer face of the pivotal portion 71. A pin 613 is extended through each of the pivot holes 612 into the pivot hole 713 of one of the pivotal portions 71, allowing the house 6 to pivot relative to the coupling seat 7 until a desired angular position is reached. The teeth 72 and 621 provide a reliable retaining effect for the housing 6.

Figure 9:
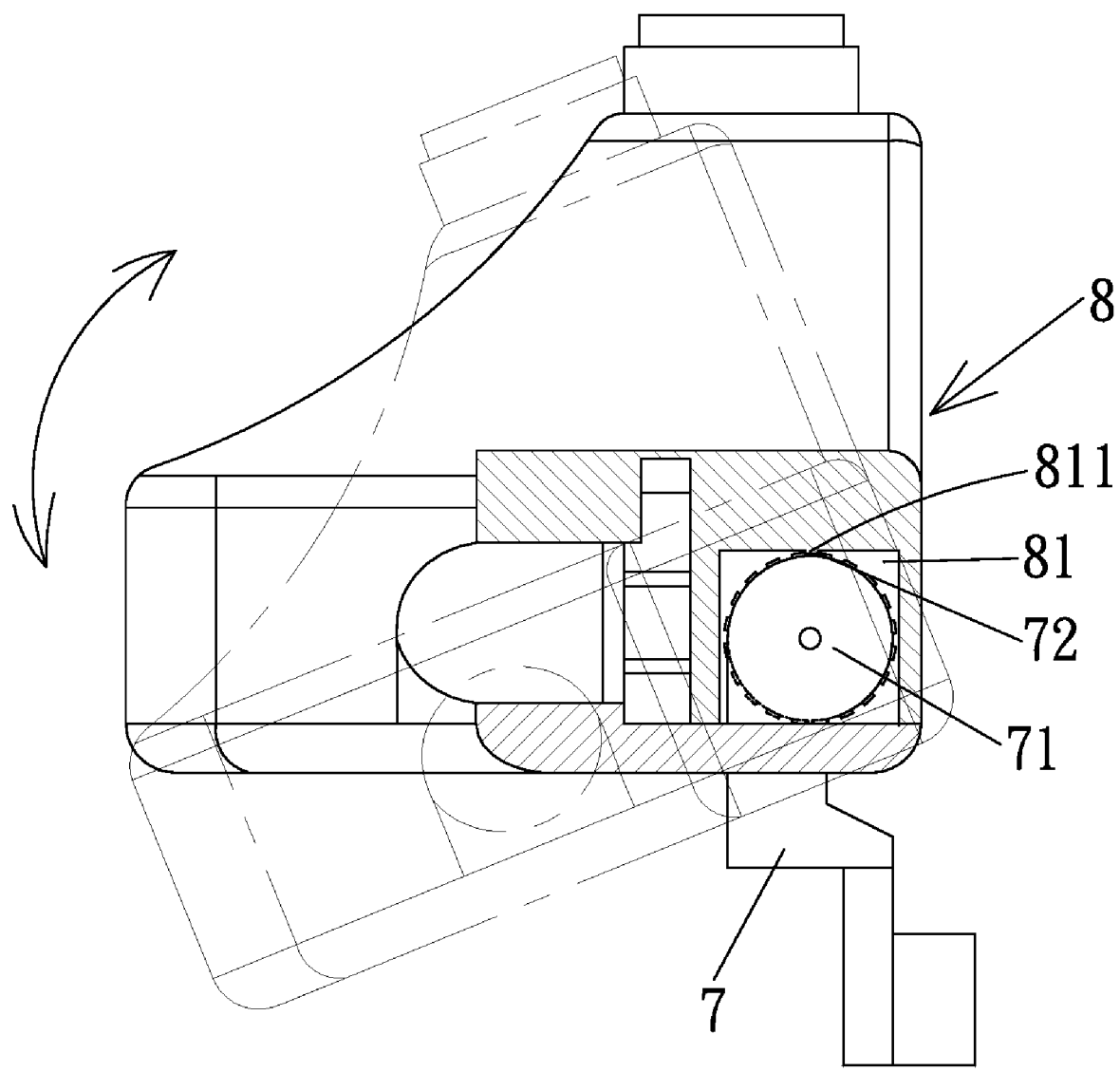
FIG. 9 shows a cross sectional view of an illuminating device of a third embodiment according to the preferred teachings of the present invention.
Figure 11:
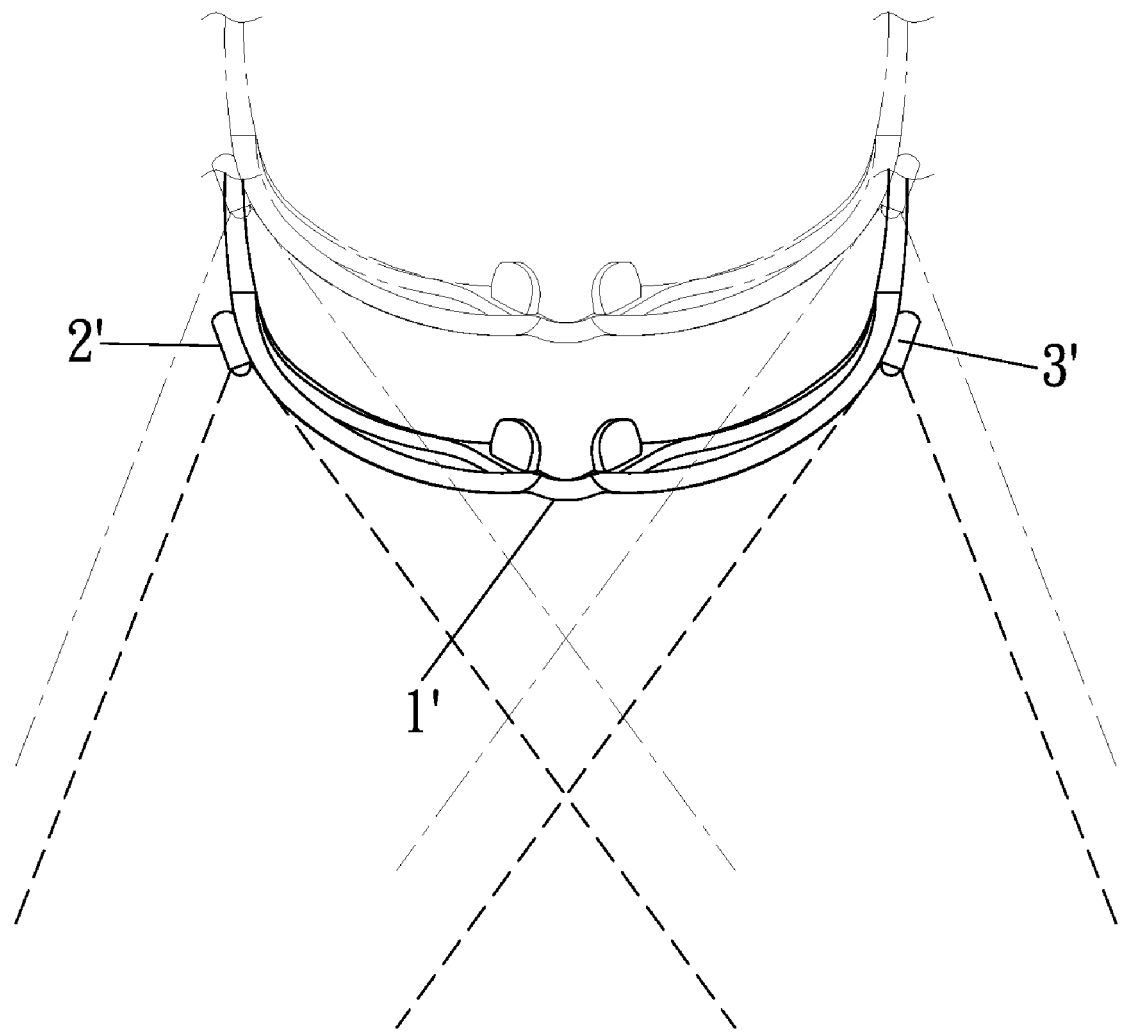
FIG. 11 shows a partial, top view of a pair of glasses with a lamp mounted to each of two sides thereof.
Figure 12:
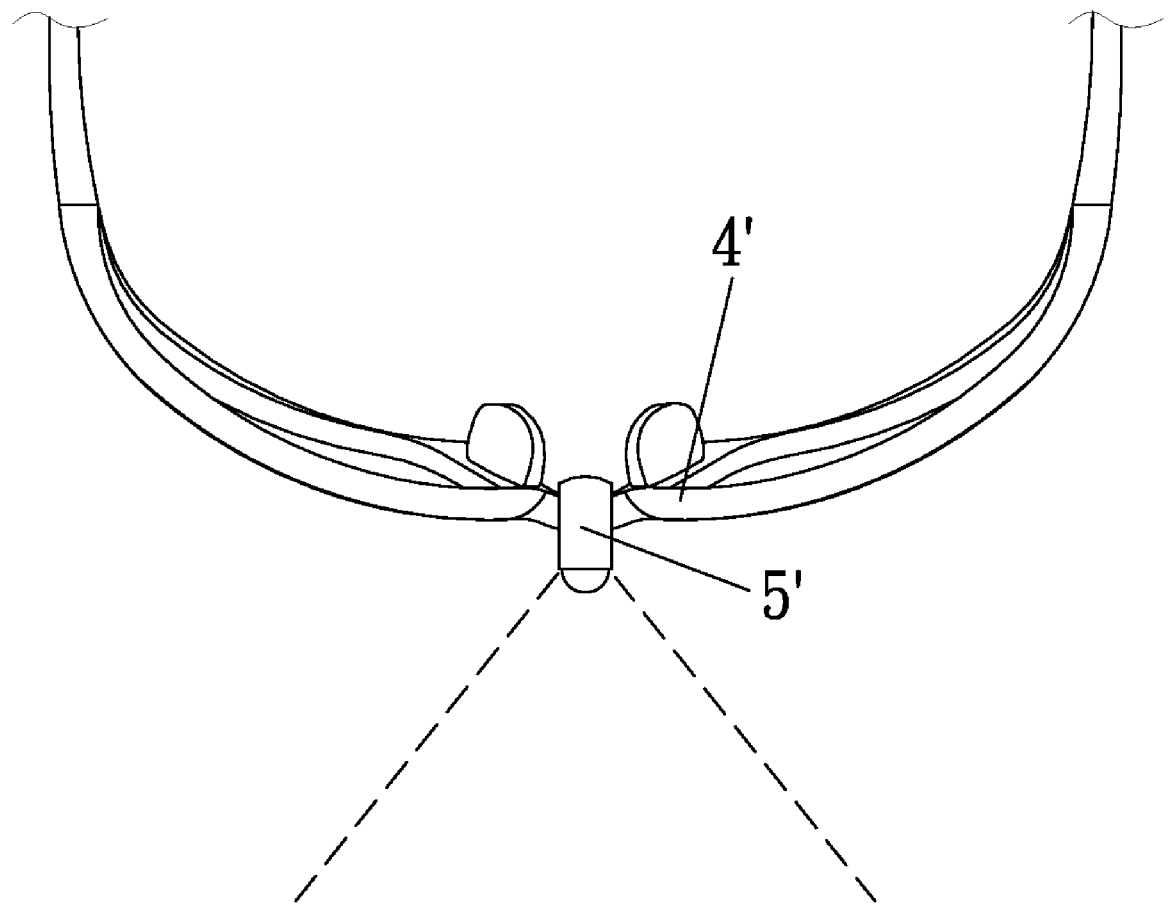
FIG. 12 shows a partial, top view of a pair of glasses with a lamp fixed to a middle of a frame of the pair of glasses.
Figure 13:
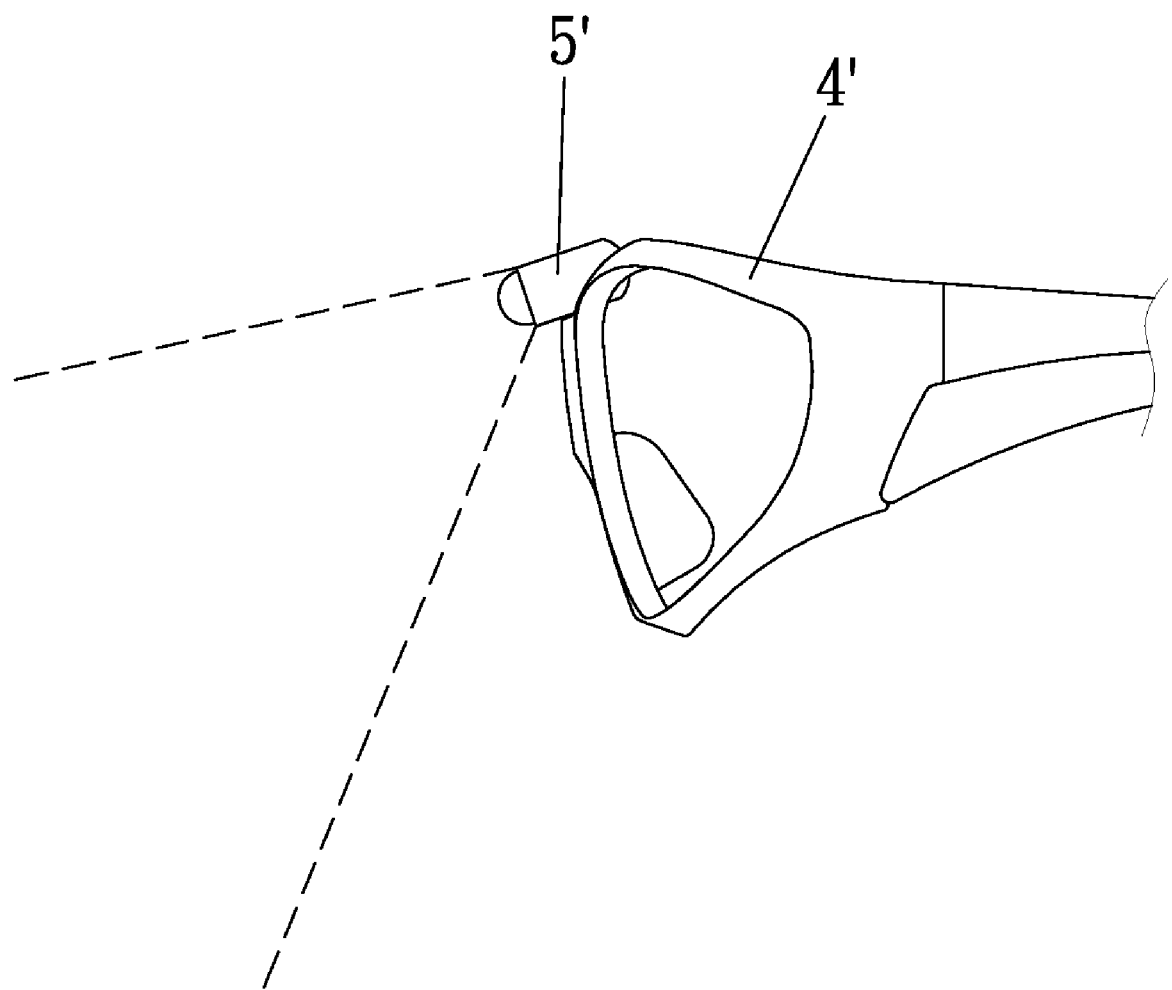
FIG. 13 shows a partial, side view of the pair of glasses of FIG. 12.

FIG. 9 shows a third embodiment modified from the second embodiment, wherein each chamber (now designated 81) of the housing (now designated 8) includes a tooth 811 for selectively engaging with the teeth 72 of one of the pivotal portions 71 of the coupling seat 7 to retain the housing 8 in a desired angular position relative to the coupling seat 7.

FIG. 10 illustrates a fourth embodiment modified from the first embodiment, wherein the housing 90 does not include chambers 214. Each elastic element 4 includes a first end pressing against an outer side of the housing 90 and a second end pressing against one of the pivotal portions (now designated 911) of the coupling seat (now designated 91). A desired positioning effect is provided for the housing 90 even though the elastic elements 4 are exposed.

The illuminating device 1 can include only one lamp 12, and housing 2 can include only one compartment 214 in a desired location. Furthermore, the bottom board 22 can include only one slot 223. Further, the housing 2 can be pivotably coupled to the coupling seat 3 by other arrangements.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. An illuminating device for a pair of glasses, comprising:
an illumination control device including a lamp;
a housing receiving the illumination control device, with the lamp emitting light beams out of the housing;
a coupling seat including first and second pivotal portions, with the housing pivotably coupled with the first and second pivotal portions, so that the housing is pivotable relative to the coupling seat, with the coupling seat including a coupling section adapted to be coupled to a middle of the pair of glasses;
a positioning mechanism retaining the housing in a desired angular position relative to the coupling seat, adjusting an illuminating angle of the lamp; and
said housing including a cover and a bottom board mounted to a bottom of the cover, with the cover including first and second chambers in two sides thereof, with the bottom board further including first and second slots extending inward from an end edge thereof and aligned with the first and second chambers of the cover, with the coupling seat including first and second protrusions on two sides thereof, with each of the first and second protrusions extended through an open end of one of the first and second slots into one of the first and second chambers, with each of the first and second protrusions including a pivotal portion having a width larger than a width of the first and second protrusions and than a width of the first and second slots, with each of the pivotal portions including circular cross sections and received in one of the first and second chambers of the cover, preventing the coupling seat from disengaging from the housing while allowing pivotal movement of the housing relative to the coupling seat.

2. The illuminating device as claimed in claim 1, with the illumination control device including a circuit board electrically connected to the lamp and a switch controlling on/off of the lamp, with the lamp being a light-emitting diode, with the cover including a compartment receiving the circuit board, with the cover further including a first groove for receiving the lamp, with the bottom board including a second groove, and with the first and second grooves together securely holding the lamp.

3. The illuminating device as claimed in claim 1, with the positioning mechanism including first and second elastic elements respectively received in the first and second chambers of the cover, with each of the first and second elastic elements including a first end pressing against a wall of one of the first and second chambers and a second end pressing against one of the pivotal portions, providing coupling tightness between the coupling seat and the cover.

* * * * *